Feb. 26, 1963 R. B. JOHNSON 3,079,594
DECODING DEVICE
Filed Aug. 23, 1957
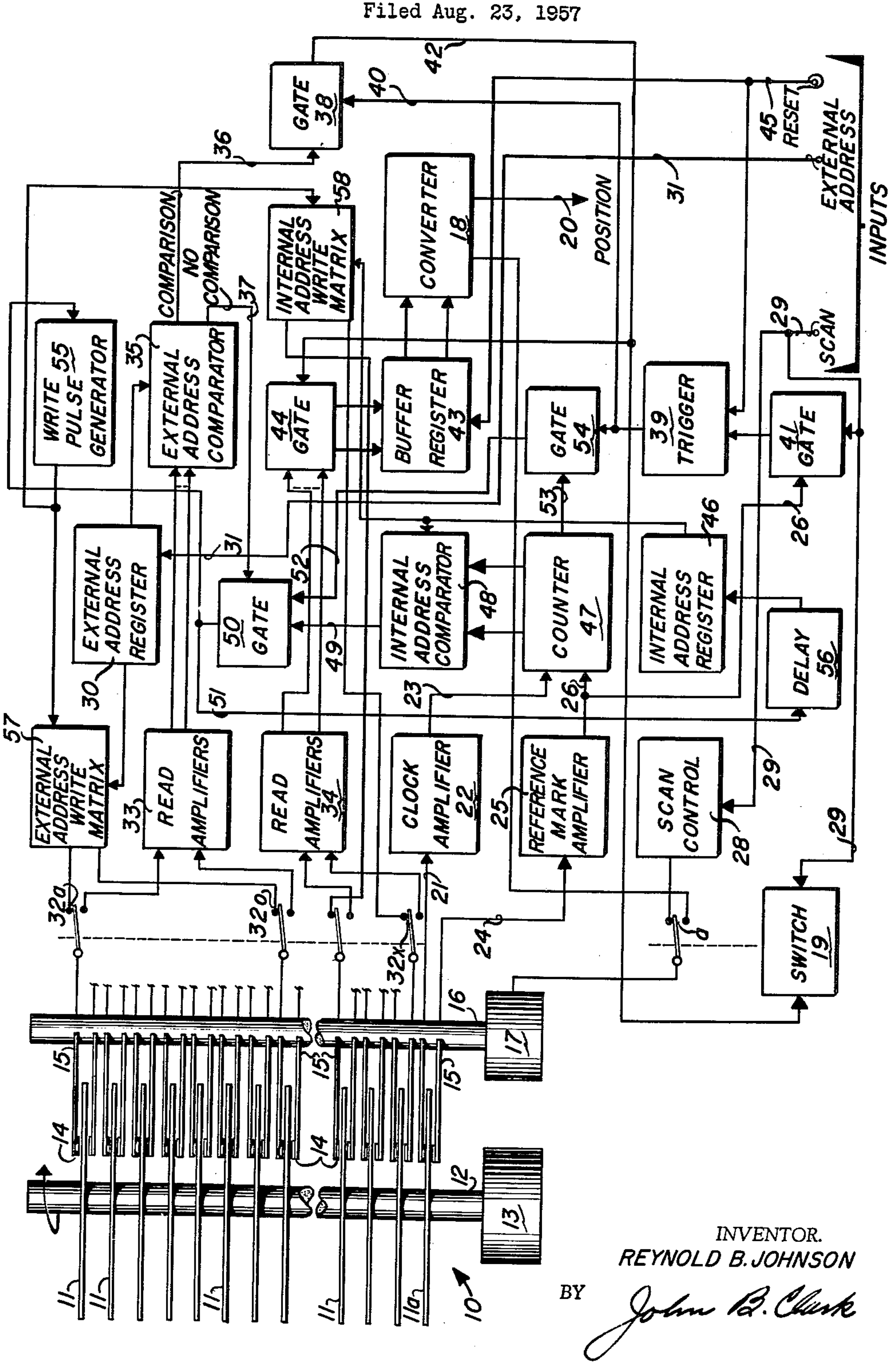
INVENTOR.
REYNOLD B. JOHNSON
BY John B. Clark
ATTORNEY

3,079,594
DECODING DEVICE

Reynold B. Johnson, Palo Alto, Calif., assignor to International Business Machines Corporation, New York, N.Y., a corporation of New York Filed Aug. 23, 1957, Ser. No. 679,850
8 Claims. (Cl. 340—174.1)

The present invention pertains generally to decoding devices and relates more particularly to a table lookup device for converting information from one form to another.

The embodiment of the invention disclosed herein is directed to structure for converting addresses of stored data from one form to another, although it will be understood that the invention should not be limited to this use. Many other applications wherein it is desired to convert information from one form to another on a table lookup basis will become obvious to those skilled in the art.

Access to selected data stored in any memory device requires specific information regarding the location of the data within the memory. This information is referred to herein as the internal address of the selected data, and when the memory is supplied with the internal address, access to the selected data is readily obtained. A problem arises, however, when the data stored in the memory is identified by an established catalog number or a serial number or the like, i.e., by an external address which does not correspond to the internal address in some uniform manner. If the location of the selected data is to be identified by such an external address, it is necessary to convert the external address to the corresponding internal address before the data can be located in the memory.

An object of the invention, therefore, is to provide an improved table lookup device.

Another object is to provide a new and improved device for converting data from one form to another.

A further object is to provide structure for converting an external address to a corresponding internal address for obtaining access to data stored according to the internal address and defined by the external address.

According to the invention, the various external addresses utilized in connection with a given system are stored in a memory, the related internal addresses also being stored in a memory in locations corresponding to the locations of the related external addresses. Means are provided for scanning external and internal address storage locations simultaneously for detecting stored addresses. When supplied with an external address to be converted, the supplied address is compared with the various detected external addresses and a resulting comparison controls the selection of the corresponding internal address.

Thus, a further object is to provide a device for determining an internal address according to the storage location of the correspondings external address.

Still another object is to provide a system wherein external addresses are stored in locations corresponding to the storage locations of the related internal addresses and internal addresses are determined according to comparisons between supplied and stored external addresses while scanning the internal and external address storage locations simultaneously.

A further object is to provide a device wherein internal and related external addresses are stored in corresponding locations in a memory and the location of a predetermined internal address is determinted according to the location of the corresponding external address.

If, upon completion of the scanning operation, no external address is detected which corresponds to an external address to be converted, i.e., if the address to be converted is a new address for which decoding provisions have not been made, it is necessary to "update" or extend the table. To this end, new addresses are entered in storage serially by location as they occur and means are provided for recording the location of the next blank address storage location for controlling the entry of the next new address therein. Thus, when an external address is entered for conversion and it is found that this address is a new one, the invention is arranged to determine the associated internal address and to enter these addresses in corresponding blank storage locations for controlling future conversion operations.

A still further object, therefore, is to provide a table lookup device having provisions for extending the table.

Another object is to provide a device of the type described for determining new external addresses.

Still another object is to provide an address conversion device wherein supplied external addresses are compared with stored external addresses and new external addresses are entered in storage according to the condition of a new address indicating register and under the control of a "failure-to-compare" signal.

Other objects of the invention will be pointed out in the following description and claims and illustrated in the accompanying drawing, which discloses, by way of example, the principle of the invention and the best mode which has been contemplated of applying that principle.

The drawing discloses a system block diagram of an embodiment of the decoding device of the invention.

Although the disclosed embodiment of the invention is arranged for operation in connection with a storage device such as that shown and described in the copending U.S. application for Letters Patent, Serial No. 584,705, filed May 14, 1956, in the name of Jacob J. Hagopian, now U.S. Patent No. 3,007,144 issued October 31, 1961, the teaching of the invention permits the application of many other types of storage and the invention should not be limited to the storage device shown.

Referring now to the drawing, the storage medium comprises a magnetic disc file 10 which includes a plurality of discs 11 mounted for rotation on a suitably supported shaft 12 which is driven by a motor 13 in any convenient manner. A plurality of magnetic transducers 14 are provided for cooperating with the planar surfaces of the corresponding discs 11, one such transducer 14 being provided for each disc face. Each transducer is supported by a corresponding arm 15 and the various arms are secured to a shaft 16, the radial position of which is controlled by a positioning mechanism 17 to position the arms 15 and transducers 14 adjacent selected portions of the discs 11.

Each disc face include a number of concentric data storage tracks spaced radially thereon for recording data, and access to selected tracks is obtained by furnishing a suitable internal address to a converter 18. The converter 18 may include a register or the like for storing the internal address information, and at an appropriate time, i.e., when a switch 19 is operated, it connects through the normally open, hereinafter referred to as n/o, *a* contacts of this switch to the positioning mechanism 17 for controlling it to position the transducers to the track corresponding to the internal address then present in the converter 18.

In addition to indicating the track to which the various transducers are to be positioned for reading or recording data, an internal address may also indicate the disc containing the track as well as the desired portion of that track where serial operation is desired. When parallel operation is utilized, the internal address may indicate a particular storage position on each of the various tracks. In either case, this additional information is taken from the converter 18 via a line 20 for controlling suitable selection circuitry (not shown).

One of the discs 11, such as the disc 11a, is provided for controlling system timing. This disc contains a conventional clock track which yields signals defining the various storage positions on the various tracks of the several discs. These signals are taken from an associated transducer via a line 21 to an amplifier 22, the amplified clock signals being entered on a line 23. Also recorded on the disc 11a is a so-called "reference mark" which provides a signal once each disc revolution for indicating the beginning of the data recorded on the various discs, and all timing is referenced to this signal. The reference mark is connected by a line 24 to the input of an amplifier 25 and, when amplified, is entered on a line 26 for use as will be described.

According to the present invention, one or more tracks of each disc 11 are provided for storing the various external and corresponding internal addresses. These addresses are recorded in parallel, the various signals which define a given external address and the corresponding internal address being recorded in coresponding storage locations of corresponding tracks on each of the various discs. In this way the various signals defining a given external address and the corresponding internal address are sensed simultaneously via the transducers 14. Thus, that portion of storage utilized for decoding purposes is divided into two groups, one for storing external addresses and the other for storing the corresponding internal addresses. Any portions of the discs 11 not used for decoding purposes may be used for general storage. To determine an internal address corresponding to a given external address, the various external address storage locations are scanned and the internal address signals sensed at the time a given external address is detected determine the internal address.

The decoding or address conversion operation is initiated by a "scan" signal applied to the switch 19 and to a scan control circuit 28 via a line 29. The scan signal indicates that an external address has been entered into an external address register 30 via a line 31 and that the operation for converting the entered external address to the corresponding internal address is to be initiated. This signal is arranged to operate the switch 19 for placing its *a* contacts in the condition shown in the drawing, thereby connecting the output of the scan control circuit 28 through these contacts to the positioning mechanism 17. Means are provided within the scan control circuit 28 for controlling the positioning mechanism 17 to position the various transducers at the track containing the various external addresses and corresponding internal addresses, if one track is utilized for this purpose, or at the first of the several tracks containing these addresses. In the latter instance means are also provided within the control circuit 28 for controlling the positioning mechanism to step to the next track containing the external addresses up on completion of the scan of each such track. In the present description it will be assumed that but one track is utilized for storing the various external addresses, and in this case the external address scan control circuit 28 need only control the positioning of the transducers at that track in response to the scan signal.

During a scanning operation a relay 32 (not shown in the drawing) is operated for transferring its various contacts *a* through *x*. These contacts connect the transducers 14 to corresponding read amplifiers when relay 32 is operated. The read amplifiers associated with the "external address" tracks are identified by the reference numeral 33, the read amplifiers associated with the "internal address" tracks being identified by the reference numeral 34. Thus, during a scanning operation the various transducers associated with the external address tracks connect through transferred n/o contacts of the relay 32 to the read amplifiers 33, the transducers associated with the internal address tracks being connected through transferred n/o contacts of this relay to the amplifiers 34.

As mentioned previously, the external address is entered into the register 30 and the condition of this register is arranged to determine one input to an external address comparator 35. The second input to the comparator is taken from the read amplifiers 33, and when the signals taken from the output of the read amplifiers 33 compare with the condition of the register 30, a comparison signal is generated on a line 36 taken from the comparator 35. Thus, the line 36 goes up when a comparison is made. It should also be pointed out at this time that as long as there has been no comparison, a line 37 connected to the output of the comparator 35 is high, this line being controlled to drop in potential when a comparison is made.

The line 36 connects through a gating circuit 38 to a line 42 under control of the condition of a bistable trigger 39. The trigger 39 controls the potential of a line 40 connected to the gate 38. This line is high when a scanning operation is initiated since the scan signal gates reference mark signals in a gate 41 for operating the trigger 39. Thus, the line 40 goes up at the beginning of the scanning operation for gating comparison signals to the line 42. The signal entered on the line 42 is utilized to gate the signals from the read amplifiers 34 into a buffer register 43. The output of the amplifiers 34 connects through a gate 44 to the register 43 under control of the comparison signal, and when this signal is entered on the line 42, the signals taken from the amplifiers 34 are entered into the registers 43 for recording the internal address corresponding to the external address than present in the external address register 30.

The register 43 connects to the converter 18 for operating the positioning mechanism 17 in accordance with the internal address when the switch 19 is operated. The line 42 connects to this switch for transferring its *a* contacts to connect the positioning mechanism therethrough to the converter 18. Thus, the comparison signal enters the appropriate internal address into the register 43 and also operates the switch 19 to permit control of the positioning mechanism 17 according to the condition of the register 43, thereby positioning the various transducers to the tracks defined by the address stored in the register 43.

It should now be clear that when an external address is entered into the external address register 30 and the scan signal is applied to the line 29, the disclosed mechanism determines the internal address corresponding to the condition of the register 30 for controlling the positioning mechanism 17 to position the transducers at the appropriate tracks. The trigger 39 and the buffer register 43 are reset by a reset signal applied thereto via a line 45. The reset signal may be generated in any convenient manner and is applied to the line 45 at some time prior to the occurrence of the scan signal entered on the line 29 for resetting the trigger 39 and register 43 prior to the conversion operation.

It will be recalled that means are provided for entering new external addresses and the appropriate internal address into the system. When loading the address storage locations with the external and internal address data, the locations are utilized serially, the next blank address storage location being indicated by the condition of an internal address register 46. Additionally, a counter 47, operated by clock pulses taken from the line 23 and by reference marks taken from the line 26, is provided for indicating the storage locations being scanned and is also arranged to raise the potential of a carry line 53 when all storage locations have been scanned. The condition of the internal address register 46 is continuously compared in an internal address comparator circuit 48 with the condition of the counter 47, and when there is a comparison a line 49 connected from the comparator 48 rises. This signal connects through a gate 50 to a line 51 if, and only if, the no-comparison line 37 as well as a line 52 is high. The line 37, it will be recalled, is high as long as there has been no comparison determined by the comparator 35. The line 52 goes up if the trigger 39 has been operated and the counter has carried, thereby indicating that the various address storage locations have all been scanned. This is true since the carry line 53 taken from the counter 47 connects through a gate 54, controlled by the trigger 39, to the line 52. Therefore, if the scanning operation has been completed, the line 52 rises. If also no comparison has been determined by the external address comparator 35, the line 37 is high and the compare signal generated by the internal address comparator 48 passes through the gate 50 to the line 51.

The line 51 connects to a write pulse generator 55 as well as through a delay 56 to the internal address register 46 for advancing this register to indicate the next blank address storage location. It should be noted at this time that the aforementioned relay 32 (not shown) is deenergized if there is no comparison in the comparator 35 during a scanning operation. This is accomplished in any convenient manner such as by the signal taken from the line 51. At any rate, the various contacts of the relay 32 are transferred to their normally closed, referred to hereinafter as n/c condition if no comparison is indicated. The output of the write pulse generator 55 connects through an external address write matrix 57 and through n/c contacts of the relay 32 to corresponding transducers associated with the external address discs. The condition of the write matrix 57 is controlled according to the external address stored in the register 30. The output of the write pulse generator 55 also connects through an internal address write matrix 58 and through n/c contacts of the relay 32 to the transducers associated with the internal address discs for controlling the entry of the appropriate internal address in storage, the matrix 58 being under control of the internal address register 46. Thus, when the internal address compare signal is entered on the line 51, the new external address and the corresponding internal address are entered in the appropriate storage locations determined by the register 46, this register being advanced to indicate the next blank storage location after a suitable delay.

In operation the reset signal is first applied to the line 45, thereby resetting the trigger 39 and the buffer register 43. Next, the external address is entered into the external address register 30 and the scan signal is applied to the line 29 for operating the switch 19 and for causing the scan control circuit 28 to operate the positioning mechanism 17 to position the transducers at the track containing the address storage locations. The scan signal additionally primes the gate 41, and the first reference mark to occur thereafter passes through this gate and operates the trigger 39. This opens both of the gates 38 and 54. If a comparison in the external address comparator 35 occurs after the gate 38 is opened, the compare signal is taken via the line 36 through the gate 38 to the line 42 for operating the switch 19 and for opening the gate 44 to permit the entry of the internal address signals taken from the amplifiers 34 into the buffer register 43 for controlling the positioning of the various transducers at the tracks defined by these signals.

If there has been no comparison upon completion of the scan, the lines 37 and 52 are high and the internal address comparison signal taken from the line 49 passes through the gate 50 to the line 51. This signal causes the recordation of the external address then present in the register 30 as well as the internal address then present in the register 46 in the appropriate storage locations. The signal entered on the line 51 also causes the register 46 to be advanced to indicate the next blank address storage location. Thus, the circuitry of the invention is arranged to determine internal addresses corresponding to external addresses entered in the register 30 and then to position the various transducers 14 at the determined internal address. Additionally, if a new external address is entered into the system, i.e., an address not provided for previously, the circuitry is arranged to generate a signal for entering the new external address together with the corresponding internal address in the appropriate storage locations on the various discs.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device wherein external addresses are provided for controlling access to selected general storage locations defined by corresponding internal addresses, said storage device comprising a first portion having a plurality of storage locations for storing external address signals, a second portion having a plurality of storage locations for storing internal address signals corresponding to stored external address signals, a third portion having a plurality of general storage locations defined by corresponding internal addresses, transducer means for detecting signals stored in said locations, means for controlling said transducer means to detect corresponding address signals stored in said first and second portions simultaneously, means responsive to said transducer means for recognizing predetermined detected external address signals, and means responsive to said recognizing means for controlling direct access by said transducer means to a selected storage location in said third portion according to detected internal address signals corresponding to said predetermined external address signals.

2. A storage device wherein external addresses are provided for directing access to selected general storage locations defined by corresponding internal addresses, said storage device comprising a first portion having a plurality of locations for storing signals representative of external addresses, a second portion having a plurality of locations for storing signals representative of internal addresses corresponding to stored external addresses, a third portion having a plurality of general storage locations defined by corresponding internal addresses, means for obtaining access to said storage locations, said access means including transducer means cooperating with said storage device for sensing signals stored therein and means for controlling said transducer means to cooperate with selected portions of said storage device, said access means being arranged to control said transducer means to cooperate with said first and second portions for sensing internal address signals and the corresponding external address signals simultaneously, an external address register, means for entering external address signals in said register, means for comparing sensed external address signals with the condition of said register, said access means being responsive to a comparison in said comparing means for controlling said transducer means to cooperate with said third portion for sensing signals in a selected general storage location determined by sensed internal address signals corresponding to sensed external address signals effecting a comparison.

3. The invention set forth in claim 2 with the further provision of an internal address register for indicating a new internal address and means responsive to a failure of comparison for recording signals representative of the condition of said external address register and the condition of said internal address register in storage locations of said first and second portions according to the condition of said internal address register.

4. The invention set forth in claim 3 wherein the condition of said internal address register is advanced to indicate the next new internal address available in response to the operation of said recording means.

5. A decoding device comprising a memory having a first portion for storing signals representative of external addresses and a second portion for storing signals representative of corresponding internal addresses, a first register for indicating input external addresses, means for scanning storage locations in said first and second portions, a second register for indicating an unused internal address location, means for counting scanned storage locations, means for comparing the condition of said counting means with the condition of said second register, means associated with said comparing means for generating a signal in response to the condition of said counting means comparing with the condition of said second register, and means responsive to said generated signal for recording in said first portion signals determined by the condition of said first register and for recording in said second portion signals corresponding to the condition of said second register.

6. A storage device wherein access to information stored in specific general storage locations is controlled by internal address signals derived from external address signals supplied to the device, comprising a storage medium having a plurality of general storage locations, a plurality of internal address storage locations and a plurality of external address storage locations, means for entering external address signals and the corresponding internal address signals which define various general storage locations in said external and internal address storage locations, sensing means for selectively scanning said storage medium, said means being adapted when scanning said external address storage locations to simultaneously scan said internal address storage locations and sense stored external address signals and the corresponding internal address signals simultaneously, an external address register, said register being settable according to the external address of general storage locations to which access is desired, means for initiating an access operation, said means controlling said sensing means to scan said internal and external address storage locations, a buffer register, a comparison circuit associated with said external address register and said sensing means for comparing the condition of said external address register with sensed external address signals, means responsive to a comparison between signals set in said register and said sensed signals for entering the sensed internal address signals corresponding to the external address signals causing the comparison into said buffer register, and means responsive to the condition of said buffer register for controlling said sensing means to scan a selected general storage location which corresponds to the condition of said external address register.

7. A storage device having a plurality of data storage locations accessible under control of a first register for receiving internal address information which defines selected data storage locations and addressable under control of a second register for receiving external address information which does not define data storage locations, including a plurality of internal address storage locations for storing information representative of internal addresses defining said plurality of data storage locations; a plurality of external address storage locations for storing information representative of external addresses, information representative of each external address being stored in a storage location relating to the storage location in which the corresponding internal address information is stored, means for scanning related external and internal address storage locations simultaneously, means responsive to scanned external address information which corresponds to external address information in said second register for entering the related scanned internal address information in said first register, and means responsive to said first register for controlling access to a selected data storage location in accordance with the signals stored in said first register.

8. A memory comprising a storage medium having a first portion including a plurality of storage locations for storing signals representative of external addresses and a second portion including a plurality of storage locations for storing signals representative of respective internal address forms of said external addresses; means for simultaneously scanning the storage locations of said first and second portions; means associated with said scanning means for sensing signals stored in the scanned storage locations; means for indicating input external address signals; first comparison means connected to said indicating means and said sensing means for generating a signal indicative of an identity between the signals stored in said indicating means and the signals sensed in the locations of said first portion and for generating a signal indicative of a lack of identity should none exist when all storage locations have been scanned by said scanning means; means for counting locations scanned; a storage location register; second comparison means associated with said counting means and said storage location register; and recording means responsive to the signal indicating a lack of identity from said first comparison means for recording signals indicated by said indicating means and said storage location register in response to said second comparison means indicating an identity between said counting means and said storage location register.

References Cited in the file of this patent

UNITED STATES PATENTS

| | | |
|---|---|---|
| 2,611,813 | Sharpless et al. | Sept. 23, 1952 |
| 2,680,155 | Molnar | June 1, 1954 |
| 2,771,595 | Hendrickson | Nov. 20, 1956 |
| 2,796,597 | Poorte | June 18, 1957 |
| 2,891,238 | Nettleton | June 16, 1959 |
| 2,946,044 | Bolgiano | July 19, 1960 |